(12) United States Patent
Tann

(10) Patent No.: US 7,932,643 B2
(45) Date of Patent: Apr. 26, 2011

(54) LIGHTING CONTROL SYSTEM

(76) Inventor: John A. Tann, Olathe, KS (US)

( * ) Notice: Subject to any disclaimer, the term of this patent is extended or adjusted under 35 U.S.C. 154(b) by 449 days.

(21) Appl. No.: 12/109,216

(22) Filed: Apr. 24, 2008

(65) Prior Publication Data

US 2008/0266743 A1 Oct. 30, 2008

Related U.S. Application Data

(60) Provisional application No. 60/913,650, filed on Apr. 24, 2007.

(51) Int. Cl.
*H01H 47/24* (2006.01)
*H01H 35/00* (2006.01)

(52) U.S. Cl. ........ 307/117; 307/116; 307/119; 361/173; 361/176; 361/179

(58) Field of Classification Search .................. 307/116, 307/117, 110, 119; 361/173, 176, 177
See application file for complete search history.

(56) References Cited

U.S. PATENT DOCUMENTS

| 6,891,284 | B2 * | 5/2005 | Tilley | ............................ 307/116 |
| 2007/0187577 | A1 * | 8/2007 | Kao | ........................ 250/214 SW |

* cited by examiner

*Primary Examiner* — Hal I Kaplan
(74) *Attorney, Agent, or Firm* — Hovey Williams LLP

(57) ABSTRACT

A lighting control system comprises a plurality of toggle switches, a plurality of pushbuttons, a plurality of timer circuits, a plurality of relays, and a plurality of photocells to control a first plurality of lights, a second plurality of lights, a third plurality of lights and a fourth plurality of lights. The toggle switches and pushbuttons either control the lights directly or activate the timers to control the lights. The relays may be energized to switch on the lights. The photocells may be used to control the lights that are located in an outside setting.

16 Claims, 5 Drawing Sheets

LIGHTING CONTROL SYSTEM

RELATED APPLICATION

This nonprovisional patent application claims priority benefit, with regard to all common subject matter, of earlier-filed U.S. provisional patent application titled "Lighting Control Panel", Ser. No. 60/913,650, filed Apr. 24, 2007. The identified earlier-filed application is hereby incorporated by reference in its entirety into the present application.

BACKGROUND OF THE INVENTION

1. Field of the Invention

Embodiments of the present invention relate to electric control systems. More particularly, embodiments of the present invention relate to electric control systems to control a plurality of lights.

2. Description of the Related Art

Restaurants and other establishments typically include a number of exterior lights and a number of interior lights that are controlled by a number of toggle switches. For example, several sets of toggle switches may control the lights in various sections of the interior of the establishment and other toggle switches may control the lights and signs of the exterior of the establishment. It is possible that some switches might not be turned on either through forgetfulness or simply being unaware of changing environmental conditions, leaving certain areas of the interior unnecessarily dark or leaving exterior lights and signage unilluminated when daylight is at low levels. It is also possible that some switches might not be turned off when the lights are not needed, such as exterior lights and signage during daylight hours when sunlight is plentiful. Therefore, toggle switch lighting control systems are generally ineffective by allowing lights to be off when they should be on and inefficient by allowing lights to be on when they should be off.

SUMMARY OF THE INVENTION

Embodiments of the present invention provide a distinct advance in the art of lighting control systems. More particularly, embodiments of the invention provide proper control of the interior lights of a business establishment as well as exterior lights and signage.

A lighting control system constructed in accordance with a first embodiment of the invention comprises a first toggle switch, a first timer circuit, a second timer circuit, and a set of photodetectors. The first toggle switch controls a first set of lights. The first timer circuit maintains engagement of electric power to a second set of lights for a first period of time after the first toggle switch is switched off. The second timer circuit maintains engagement of electric power to a third set of lights for a second period of time after a first pushbutton is pressed. The set of photodetectors maintains engagement of electric power to the second set of lights and the third set of lights while the first toggle switch is switched on and while ambient light is below a minimum level.

A lighting control system constructed in accordance with a second embodiment of the invention comprises a first pushbutton, a second pushbutton, a first timer circuit, and a set of photodetectors. The first pushbutton, when pressed, energizes a first relay to switch on a first set of lights. The second pushbutton, when pressed, deenergizes the first relay to switch off the first set of lights. The first timer circuit switches on a second set of lights for a first period of time after the second pushbutton has been pressed. The set of photodetectors switches on the second set of lights and the third set of lights while the first relay is energized and while ambient light is below a minimum level.

A lighting control system constructed in accordance with a third embodiment of the invention comprises a first pushbutton, a second pushbutton, a first photodetector, a second photodetector, a first relay, a second relay, a third relay, a fourth relay, and a first timer circuit. The first pushbutton switches on a first set of lights. The second pushbutton switches on a second set of lights. The first photodetector switches on a third set of lights after a second pushbutton has been pressed and while exterior ambient light is below a minimum level. The second photodetector switches on a fourth set of lights after the second pushbutton has been pressed and while exterior ambient light is below a minimum level. The first relay couples the first set of lights to an electric power source. The second relay couples the second set of lights to the electric power source. The third relay couples the third set of lights to an electric power source. The fourth relay couples the fourth set of lights to the electric power source. The first timer circuit switches on the second set of lights for a first period of time after a third pushbutton has been pressed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

Figure 1:
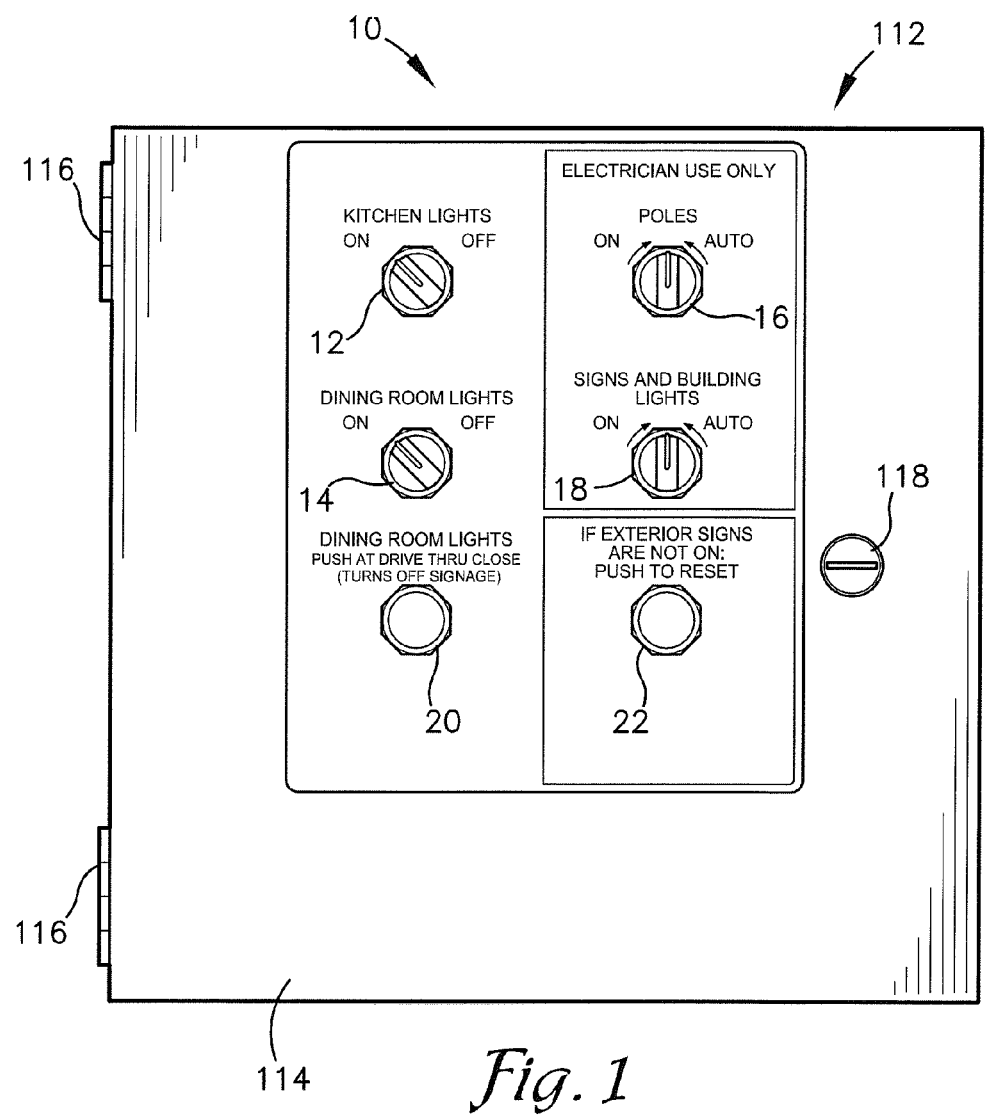
FIG. 1 is an elevational view of the cover of an enclosure to house the lighting control system constructed in accordance with a first embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

Figure 2:
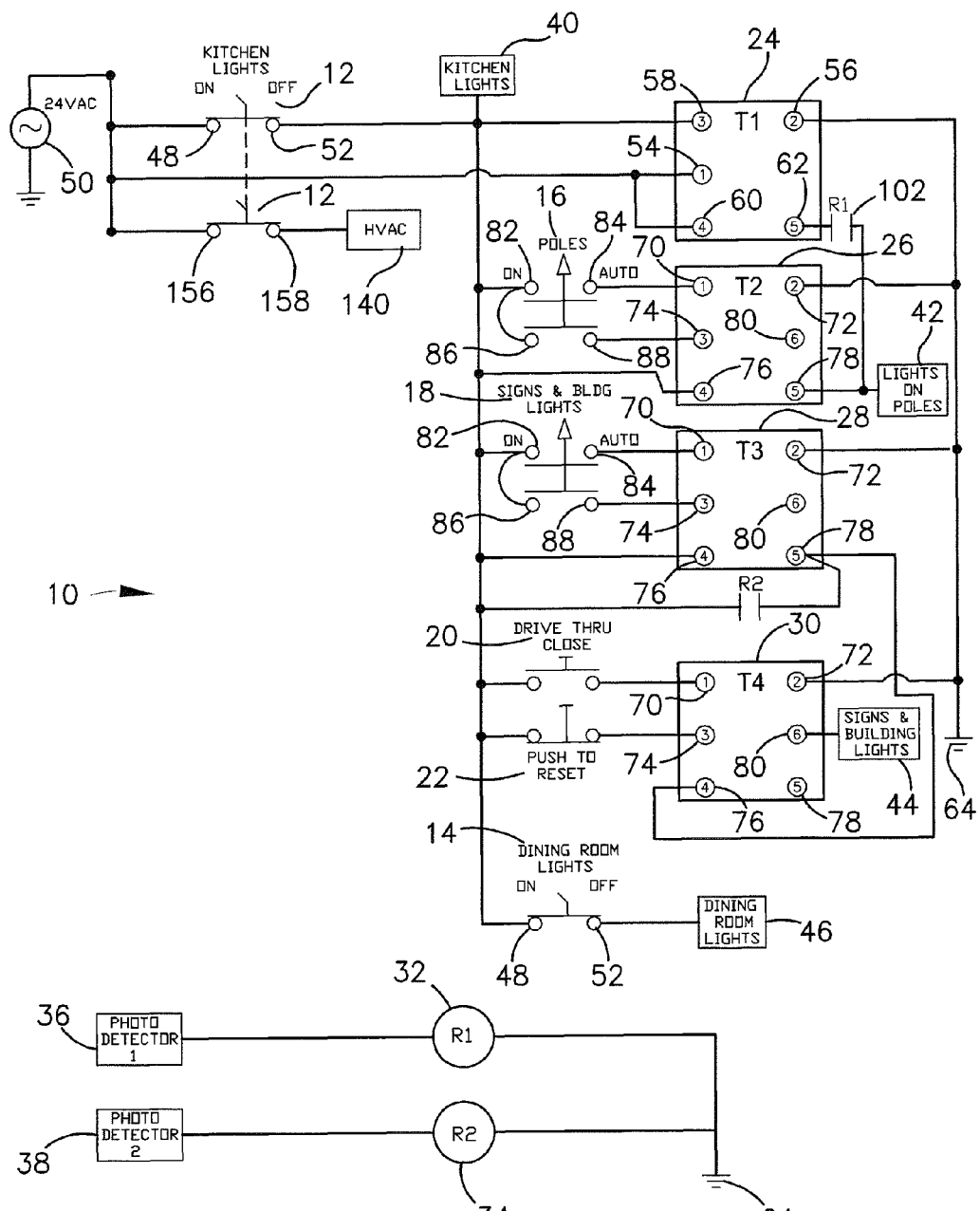
FIG. 2 is a schematic view of the first embodiment of the lighting control system.

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIGS. 1 and 2 illustrate a lighting control system 10 constructed in accordance with a first embodiment of the invention. The lighting control system 10 may be used to control the lights of a business establishment. Typically the lighting control system 10 is used to control the lights of a restaurant, wherein the lights may include lights for the kitchen area, lights for the dining room area, lights for the exterior of the building, lights for signs, and lights for the parking lot. The lights may also include lights and signs for a drive-thru window. The lighting control system 10 may also be used with other types of business establishments, such as retail sales, which may include lights for a store room or storage area, lights for a showroom or sales area, lights for the exterior and signs, and lights for a parking lot. In general, the lighting control system 10 may be used in any environment that includes a plurality of lights or similar electric loads where a minimum number of switches with timed control is desired.

The lighting control system 10 may include a first toggle switch 12, a second toggle switch 14, a third toggle switch 16, a fourth toggle switch 18, a first pushbutton 20, a second pushbutton 22, a first timer circuit 24, a second timer circuit 26, a third timer circuit 28, a fourth timer circuit 30, a first relay 32, a second relay 34, a first photodetector 36 and a second photodetector 38. The lighting control system 10 may control a first plurality of lights 40, a second plurality of lights 42, a third plurality of lights 44, and a fourth plurality of lights 46.

The first toggle switch 12 may be any device capable of switching electric power to a light or set of lights. For example, the first toggle switch 12 may be a two position switch with positions labeled Off and On. Thus, the first toggle switch 12 may be a two-terminal, single throw switch with one or more poles. An example of the first toggle switch 12 may be the ASW200 manufactured by Idec Corporation of Osaka, Japan. A first terminal 48 of the first toggle switch 12 may be connected to a first electric power source 50, typically a voltage supply which may be generating a first voltage level of approximately 24 Volts alternating current (VAC).

A second terminal 52 may be connected to a plurality of timer inputs, other switches and pushbuttons. The second terminal 52 of the first toggle switch 12 may also be connected to the first plurality of lights 40, which may be lights for the kitchen area. Thus, when the first toggle switch 12 is switched on the lights of the kitchen may be on. The second toggle switch 14 may be substantially similar to the first toggle switch 12. The first terminal 48 of the second toggle switch 14 may be coupled to the second terminal of the first toggle switch 12 and the second terminal 52 of the second toggle switch 14 may be coupled to the fourth plurality of lights 46, which may be the lights for the dining room area. Due to this series connection of the first toggle switch 12 and the second toggle switch 14, the dining room lights may be on when the second toggle switch 14 and the first toggle switch 12 are both switched on.

The first toggle switch 12 may include a second set of contacts with first and second terminals 156, 158 that connect to the first electric power source 50 and send a signal to a heating, ventilation, and air conditioning (HVAC) system 140. Typically, the signal is sent to the controller of the HVAC system 140 to set it to normal operation.

The first timer circuit 24 may be any timing device capable of switching on or off a load at the end of a period of time. For example, the first timer circuit 24 may be a relay with timer functionality included wherein the output load is still energized for a first period of time after a control input signal has been deactivated. An example of the first timer circuit 24 may be the TGML31000A2J, manufactured by Airotronics of Cazenovia, N.Y. The first timer circuit 24 may include five terminals 54, 56, 58, 60, 62 as shown in FIG. 2. The first terminal 54 may be connected to the electric power source 50 to power the timer circuit. The second terminal 56 may be connected to a common, ground, or neutral point 64 of the electric power source 50. The third terminal 58 is the control input that, when activated or asserted, closes the contacts between a normally open output and a common terminal. The fourth terminal 60 is the common terminal. The fifth terminal 62 is the normally open output. Furthermore, contact between the normally open output and the common terminal remains closed for a first period of time after the control input is deactivated. In the instance of the first timer circuit 24, the first period of time is approximately 1,000 seconds or approximately 17 minutes.

Regarding the first timer circuit 24, the first terminal 54 may be connected to the first electric power source 50. The second terminal 56 may be connected to circuit ground 64. The third terminal 58 may be connected to the second terminal of the first toggle switch 12. The fourth terminal 60 may be connected to the first electric power source 50. The fifth terminal 62 may be connected to a first normally open contact terminal of the first relay 32, wherein a second normally open contact terminal of the first relay 32 is connected to the second plurality of lights 42. Thus, the fifth terminal 62 makes contact with the fourth terminal 60 and in turn, the first electric power source 50 as long as the first toggle switch 12 is on and for the first period of time after the first toggle switch 12 is off. Therefore, the second plurality of lights 42, which is the lights on the poles in a parking lot, is on when the output of the first timer circuit 24 is on and the first relay 32 is energized.

The second timer circuit 26 may be any timing device capable of switching on or off a load at the end of a period of time. For example, the second timer circuit 26 may be a relay with timer functionality included wherein the output load is still energized for a second period of time after an input signal has been deactivated. An example of the second timer circuit 26 may be the TGML33HC1H, manufactured by Airotronics of Cazenovia, N.Y. The second timer circuit 26 may include six terminals 70, 72, 74, 76, 78, 80 as shown in FIG. 2. The first terminal 70 may be connected to the electric power source 50 to power the timer circuit. The second terminal 72 may connected to a common, ground, or neutral point 64 of the electric power source 50. The third terminal 74 is the control input that, when activated or asserted, closes the contacts between a normally open output and a common terminal and opens the contacts between a normally closed output and the common terminal. The fourth terminal 76 is the common terminal. The fifth terminal 78 is the normally open output. The sixth terminal 80 is the normally closed contact. Furthermore, contact between the normally open output and the common terminal remains closed for the second period of time after the control input is deactivated, while contact between the normally closed output and the common terminal remains opened for the second period of time after the control input is deactivated. In the instance of the second timer circuit 26, the second period of time is approximately three hours.

The third toggle switch 16 may be any device capable of switching electric power to a light or set of lights. For example, the third toggle switch 16 may be a two-position toggle switch with a spring return to center configuration. The third toggle switch 16 may include four terminals 82, 84, 86, 88. When the switch 16 is turned toward the On position, the knob returns automatically to the center position when the knob is released. Contact is maintained between the first terminal 82 and the second terminal 84. Momentary contact is established and then broken between the third terminal 86 and the fourth terminal 88. When the switch 16 is turned toward the Auto position, the knob returns automatically to the center position when the knob is released. Contact is maintained between the third terminal 86 and the fourth terminal 88. Momentary contact is established and then broken between the first terminal 82 and the second terminal 84.

Regarding the second timer circuit 26, the first terminal 70 may be connected to the second terminal 84 of the third toggle switch 16. The second terminal may 72 be connected to circuit ground 64. The third terminal 74 may be connected to the fourth terminal 88 of the third toggle switch 16. The fourth terminal 76 may be connected to the second terminal 52 of the first toggle switch 12. The fifth terminal 78 may be connected to the second plurality of lights 42 (the lights on the poles in a parking lot). The sixth terminal 80 may be open. The first and third terminals 82, 86 of the third toggle switch 16 may be both connected to the second terminal 52 of the first toggle switch 12.

When the knob of the third toggle switch 16 is turned to the On position and released, the first terminal 70 of the second timer circuit 26 maintains contact with the second terminal 52 of the first toggle switch 12, which is supplied with electrical power as long as the first toggle switch 12 is on. The third terminal 74 has a momentary contact with electric power, as long as the first toggle switch 12 is on. With electric power connected to the first terminal 70 and temporary electric power connected to the third terminal 74, the timer function of the second timer circuit 26 is activated. Thus, contact between the fourth 76 and fifth 78 terminals of the second timer circuit 26 is established for the second period of time. As a result, the second plurality of lights 42 is turned on for the second period of time, as long as the first toggle switch 12 is on.

When the knob of the third toggle switch 16 is turned to the Auto position and released, contact between the first terminal 70 of the second timer circuit 26 and electric power is broken, thereby resetting the timer function and restoring the normally open contact of the fifth terminal 78 of the second timer circuit 26 its normally open state, thus turning off the second plurality of lights 42.

The third timer circuit 28 is substantially similar to the second timer circuit 26. The fourth toggle switch 18 is substantially similar to the third toggle switch 16. Regarding the third timer circuit 28, the first terminal 70 may be connected to the second terminal 84 of the fourth toggle switch 18. The second terminal may be connected to circuit ground 64. The third terminal 74 may be connected to the fourth terminal 88 of the fourth toggle switch 18. The fourth terminal 76 may be connected to the second terminal 52 of the first toggle switch 12. The fifth terminal 78 may be connected to both the second normally open contact terminal 110 of the second relay 34 and the fourth terminal 76 of the fourth timer circuit 30. The sixth terminal 80 may be open. The first and third terminals 82, 86 of the fourth toggle switch 18 may be both connected to the second terminal 52 of the first toggle switch 12.

When the knob of the fourth toggle switch 18 is turned to the On position and released, the first terminal 70 of the third timer circuit 28 maintains contact with the second terminal 52 of the first toggle switch 12, which is electrical power as long as the first toggle switch 12 is on. The third terminal 74 has a momentary contact with electric power, as long as the first toggle switch 12 is on. With electric power connected to the first terminal 70 and temporary electric power connected to the third terminal 74, the timer function of the third timer circuit 28 is activated. Thus, contact between the fourth and fifth terminals 76, 78 of the third timer circuit 28 is established for the second period of time. As a result, electric power is provided to the fourth terminal 76 of the fourth timer circuit 30 for the second period of time.

When the knob of the fourth toggle switch 18 is turned to the Auto position and released, contact between the first terminal 70 of the third timer circuit 28 and electric power is broken, thereby resetting the timer function and restoring the normally open contact of the fifth terminal 78 of the third timer circuit 28 to its normally open state, thus removing electric power from the fourth terminal 76 of the third timer circuit 28.

The use of the third toggle switch 16 with the second timer circuit 26 and the use of the fourth toggle switch 18 with the third timer circuit 28 generally allows for maintenance of the second plurality of lights 42 and the third plurality of lights 44, which may be all the external lights and lights for signs. Typically, maintenance occurs during the daylight hours when the lights are normally off. The maintenance worker may turn the second plurality of lights 42 and the third plurality of lights 44 on by rotating both the third toggle switch 16 and the fourth toggle switch 18 to the On position. This allows the lights to be on for the second period of time, which is approximately three hours. When the work is done, the maintenance worker can turn the lights off by rotating both the third and fourth toggle switches 16, 18 to the Auto position or he can allow the second and third timer circuits 26, 28 to time out.

The first pushbutton 20 may be any button or knob capable of making electric contact between two terminals. For example, the first pushbutton 20 may be a normally open pushbutton with two terminals, wherein contact is made between the first terminal and the second terminal as long as the pushbutton is pressed. The second pushbutton 22 may be a normally closed pushbutton with two terminals, wherein contact is broken between the first terminal and the second terminal as long as the pushbutton is pressed.

The fourth timer circuit 30 is substantially similar to the third timer circuit 28. Regarding the fourth timer circuit 30, the first terminal may be connected to the second terminal of the first pushbutton 20. The second terminal may be connected to circuit ground 64. The third terminal may be connected to the second terminal of the second pushbutton 22. The fourth terminal may be connected to both the fifth terminal of the third timer circuit 28 and the second normally open contact terminal of the second relay 34. The fifth terminal may be open. The sixth terminal may be connected to the third plurality of lights 44, which may be the building lights and the lights for the signs. The first terminal of the first pushbutton 20 may be connected to the second terminal of the first toggle switch 12. The first terminal of the second pushbutton 22 may also be connected to the second terminal of the first toggle switch 12.

When the first pushbutton 20 is pressed and released, the timer function of the fourth timer circuit 30 is activated and the contact between the sixth terminal and the fourth terminal is broken for the second period of time. Accordingly, electric power is disconnected to the third plurality of lights 44 as long as the timer function of the third timer is activated or as long as the second relay 34 is energized.

When the second pushbutton 22 is pressed and released, the timer function of the fourth timer is deactivated and contact between the fourth terminal and the sixth terminal is closed as long as the first toggle switch 12 is on. Thus, the third plurality of lights 44 returns to its normal state.

The first photodetector 36 generates a signal corresponding to the amount of light that impinges the photodetector. Generally, the first and second photodetectors 36, 38 are mounted on the exterior of the business establishment, perhaps on or near the roof in order to measure the level of daylight. The first photodetector 36 may include photocells, solar cells, photoresistors, or other elements made from photon-sensitive semiconductor material, and may also be coupled to the first electric power source 50 or may include auxiliary power sources. The photodetector may generate a voltage signal that is inversely proportional to the amount of ambient light that strikes the photodetector. For example, when the ambient light falls below a predetermined value, the photodetector may generate a high voltage. In various embodiments, the voltage may be equivalent to the voltage of the first electric power source 50 or approximately 24 VAC.

Figure 3:
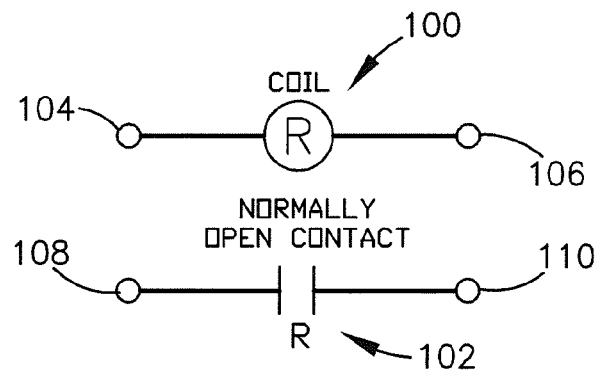
FIG. 3 is a schematic view of a relay.

The first relay 32 may be a standard relay including a coil 100 and one or more sets of normally open contacts 102 as shown in FIG. 3. The coil 100 may include first and second terminals 104, 106 and the normally open contacts may include first and second terminals 108, 110 as well. An example of the relay may be the RH2B-UL-24 manufactured by Idec Corporation of Osaka, Japan. Generally, when an electric current is forced through the coil 100, typically by applying a voltage from the first terminal 104 of the coil to the second terminal 106, the relay is said to be energized and the normally open contact is closed, thereby establishing contact between the first and second terminals 108, 110 of the normally open contacts.

The first photodetector 36 may be coupled with the first terminal 104 of the coil of the first relay 32. The second terminal 106 of the relay coil may be connected to the circuit ground 64. Thus, when ambient light striking the first photodetector 36 falls below a predetermined level, the first photodetector 36 generates a voltage sufficient to energize the first relay 32, thereby closing the normally open contact 102 and turning on the second plurality of lights 42 as long as the first toggle switch 12 is on.

The second photodetector 38 may be substantially similar to the first photodetector 36. The second relay 34 may be substantially similar to the first relay 32. The second photodetector 38 may be coupled to the first terminal of the coil of the second relay 34. The second coil terminal may be connected to the circuit ground 64. Thus, when ambient light striking the second photodetector 38 falls below a predetermined level, the second photodetector 38 generates a voltage sufficient to energize the second relay 34, thereby closing the normally open contact and turning on the third plurality of lights 44 as long as the fourth timer circuit 30 is in a normal state.

At least a portion of the system 10 may be housed in an enclosure 112 that includes a removable cover 114. The enclosure 112 is generally of a box shape and is typically constructed from metal, such as galvanized steel. The enclosure 112 is typically mounted to a wall of the interior of a building—generally in a wiring or electrical closet. One or more components may be mounted on the cover 114 of the enclosure 112, while one or more components may be mounted to the interior generally the bottom of the interior. The cover 114 is generally coupled to the enclosure 112 with a hinge 116 to allow the cover 114 to be opened, thus gaining access to the interior components. Also included on the cover 114 of the enclosure 112 may be a latch 118 to maintain closure of the cover 114. The enclosure 112 may include a plurality of knockout or punchout sections in which one or more holes may be easily created on the sides of the enclosure 112 to allow one or more wires or cables to pass through, thereby connecting one or more interior components to one or more exterior components.

Mounted to the cover 114 of the enclosure 112 may be the first toggle switch 12, the second toggle switch 14, the third toggle switch 16, the fourth toggle switch 18, the first pushbutton 20, and the second pushbutton 22. Mounted within the enclosure 112 may be the first timer circuit 24, the second timer circuit 26, the third timer circuit 28, the fourth timer circuit 30, the first relay 32, and the second relay 34. Located outside of the enclosure 112 may be the first photodetector 36, the second photodetector 38, and the electric power source 50. Typically, wiring or cabling, that is capable of carrying electric current, connects the components mounted to the surface of the enclosure 112, as well as the components located outside of the enclosure 112, to the components mounted within the enclosure 112.

The lighting control system 10 of the first embodiment may operate as follows. An example of the business establishment may be a restaurant with lights in the kitchen, lights in the dining room, lights in the parking lot, and lights and signs on the outside of the building. Employees enter the building, typically in the morning before the open of business, and access the enclosure 112. Someone turns on the first toggle switch 12, labeled "Kitchen Lights" (see FIG. 1). The first plurality of lights 40 (the kitchen lights) turns on. A signal is also sent to the HVAC system 140 to set it to normal operation. The first timer circuit 24 turns on and if the first photodetector 36 energizes the first relay 32 (indicating darkness outside), then the second plurality of lights 42 (the lights in the parking lot) turns on. If the second photodetector 38 energizes the second relay 34 (indicating darkness outside), then the third plurality of lights 44 (building lights and signs) turns on. The second (the lights in the parking lot) and third (building lights and signs) plurality of lights turn off automatically as daylight increases and turn back on automatically as daylight decreases. As business opens, someone turns on the second toggle switch 14, labeled "Dining Room Lights". The fourth plurality of lights 46 (the dining room lights) turns on if the first toggle switch 12 is already switched on.

When it is time to close, an employee pushes the first pushbutton 20, labeled "Dining Room Lights Push at Drive Thru Close (Turns Off Signage)". This shuts off the third plurality of lights (building lights and signs) and activates the timer function of the fourth timer circuit 30, allowing three hours for the employees to close the restaurant before the third plurality of lights (building lights and signs) turn back on. If the first pushbutton 20 is accidentally pressed, the fourth timer can be reset by pressing the second pushbutton 22, labeled "If Exterior Signs Are Not On: Push to Reset". The employee may turn off the second toggle switch 14 ("Dining Room Lights") to turn off the dining room lights. Employees may continue to finish closing the kitchen area. If the employees forget to turn off the second toggle switch 14 ("Dining Room Lights"), then someone can turn off the first toggle switch 12 ("Kitchen Lights") to turn off all the interior lights—the first 40 and fourth plurality of lights 46—before leaving the building. Turning off the first toggle switch 12 ("Kitchen Lights") also activates the timer function of the first timer circuit 24, allowing the second plurality of lights 42 (parking lot lights) to stay on for the first period of time (approximately 17 minutes) before shutting off automatically.

If maintenance is required for either the second (parking lot lights) or third (building lights and signs) plurality of lights, then the third and fourth toggle switches 16, 18 are accessed.

Turning the third toggle switch 16 ("Poles") to the On position activates the timer function of the second timer circuit 26 and turns the second plurality of lights 42 (parking lot lights) on for the second period of time (approximately three hours), before automatically shutting off. If maintenance is completed before three hours is up, then the second plurality of lights 42 (parking lot lights) can be turned off by turning the third toggle switch 16 ("Poles") to the Auto position, thereby deactivating the timer function of the second timer circuit 26. Turning the fourth toggle switch 18 ("Signs and Building Lights") to the On position activates the timer function of the third timer circuit 28 and turns the third plurality of lights 44 (building lights and signs) on for the second period of time (approximately three hours), before automatically shutting the third plurality of lights 44 off. If maintenance is completed before three hours is up, then the third plurality of lights 44 (building lights and signs) can be turned off by turning the fourth toggle switch 18 ("Signs and Building Lights") to the Auto position, thereby deactivating the timer function of the third timer circuit 28.

Figure 4:
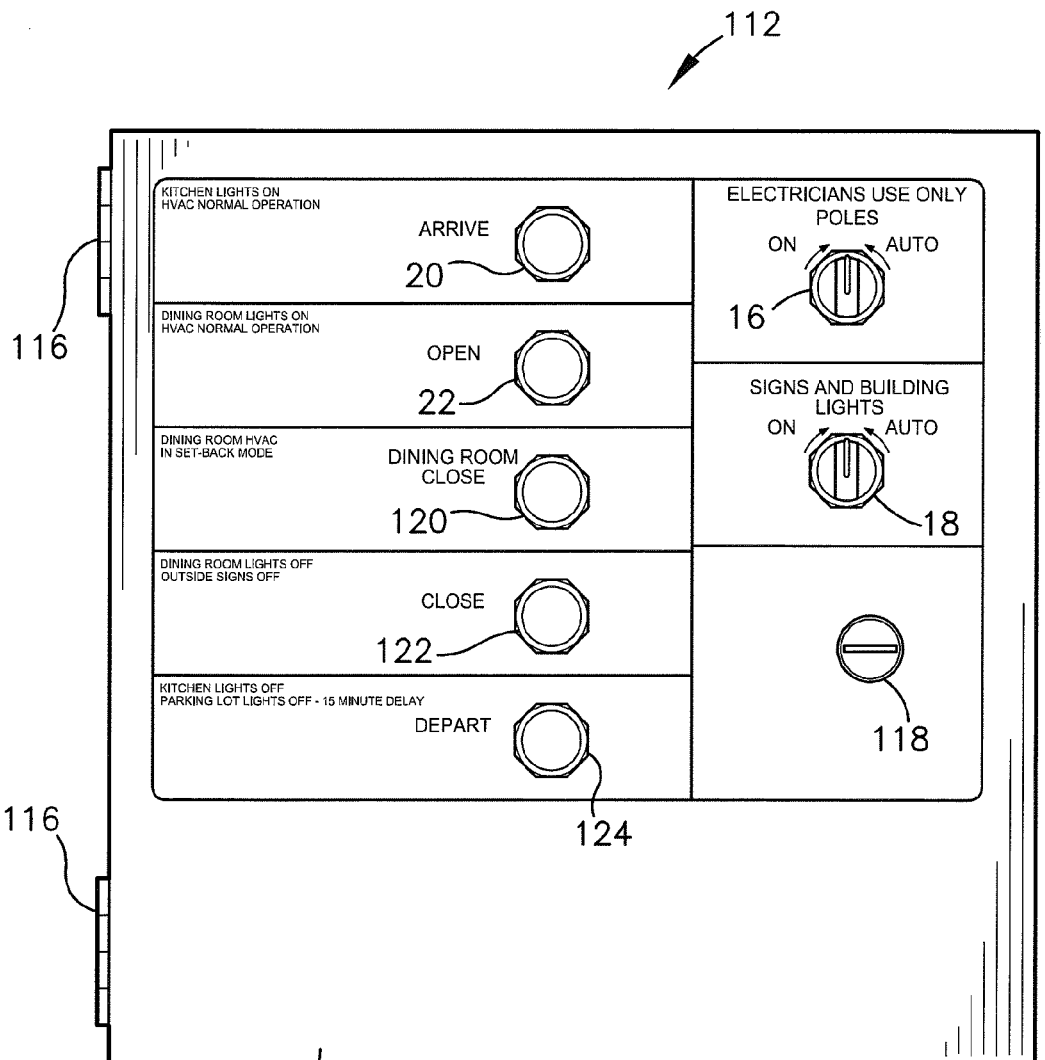
FIG. 4 is an elevational view of the cover of an enclosure to house a second embodiment and a third embodiment of the lighting control system.
Figure 5:
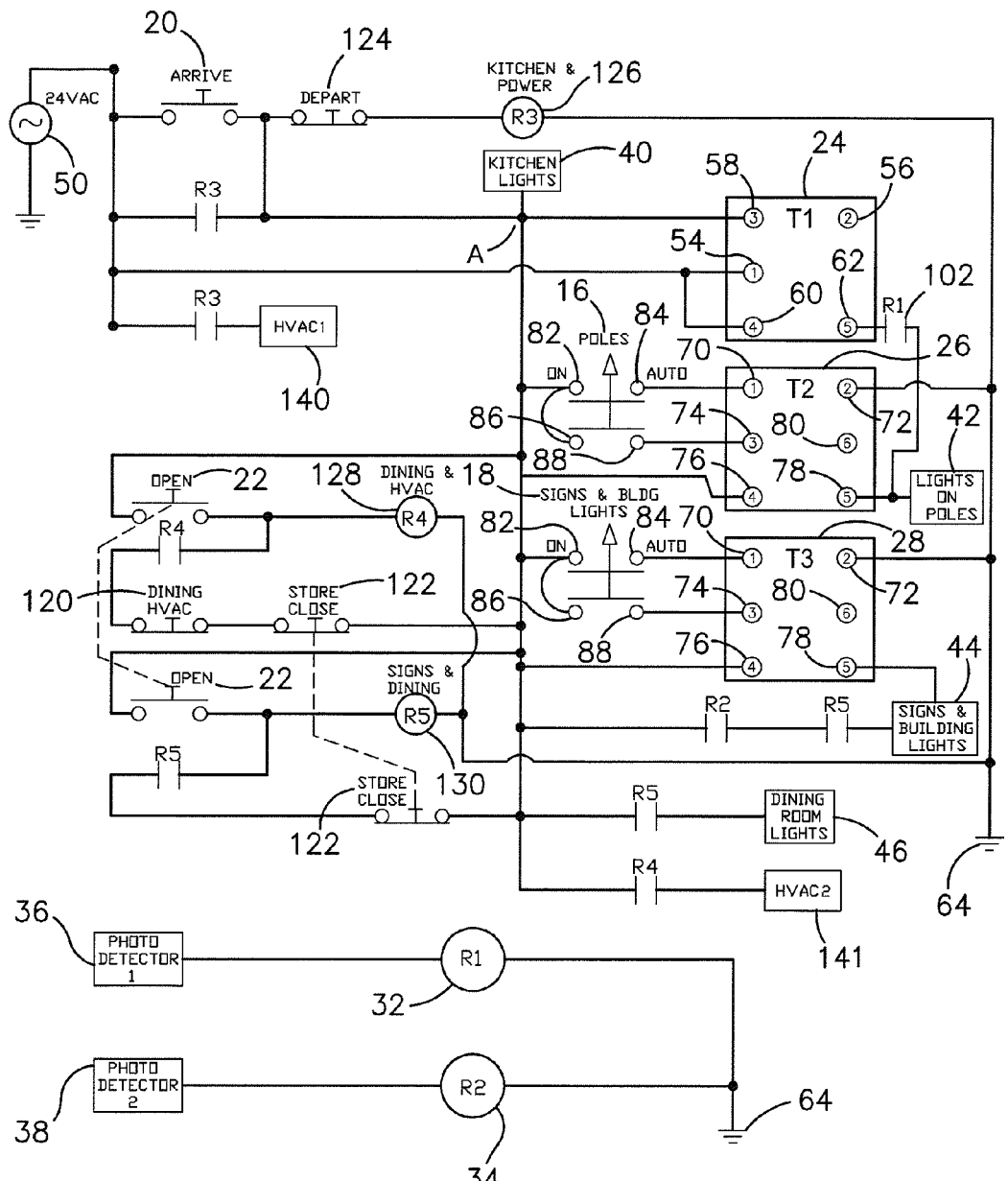
FIG. 5 is a schematic view of the second embodiment of the lighting control system.

A second embodiment of the lighting control system 10 is shown in FIGS. 4 and 5. The system 10 may include the first pushbutton 20, the second pushbutton 22, a third pushbutton 120, a fourth pushbutton 122, a fifth pushbutton 124, the third toggle switch 16, the fourth toggle switch 18, the first timer circuit 24, the second timer circuit 26, the third timer circuit 28, the first relay 32, the second relay 34, a third relay 126, a fourth relay 128, a fifth relay 130, the first photodetector 36, and the second photodetector 38.

The first pushbutton 20 and the second pushbutton 22 may be normally open pushbuttons as described above. The third pushbutton 120, the fourth pushbutton 122, and the fifth pushbutton 124 may be normally closed pushbuttons as described above. The third toggle switch 16, the fourth toggle switch 18, the first timer circuit 24, the second timer circuit 26, the third timer circuit 28, the first relay 32, the second relay 34, the first photodetector 36, and the second photodetector 38 may be substantially similar as described above. The third, fourth, and fifth relays 126, 128, 130 may include a coil configuration like the first and second relays 32, 34, but may also include up to four sets of normally open contacts. An example of the third, fourth, and fifth relays 126, 128, 130 may be the RY4S-UL-24 manufactured by Idec Corporation of Osaka, Japan.

The first pushbutton 20 may be connected to the first power source at its first terminal. The second terminal of the first pushbutton 20 may be connected to the first terminal of the fifth pushbutton 124, and the first normally open contact terminal of the third relay 126. The second terminal of the fifth pushbutton 124 may be connected to the first terminal of the coil of the third relay 126, whose second terminal may be connected to circuit ground 64. Since the first pushbutton 20 is normally open and the fifth pushbutton 124 is normally closed, pressing of the first pushbutton 20 energizes the coil of the third relay 126 thereby closing all of the normally open contacts of the third relay 126. A path is then created from the electric power source 50 through the first contacts of the third relay 126 and the fifth pushbutton 124 to maintain the energizing of the third relay 126 after the first pushbutton 20 is released. Pressing the fifth pushbutton 124 breaks the circuit path and deenergizes the third relay 126 and opens the first contacts of the third relay 126. Energizing the third relay 126 also brings electric power to a node A defined by the second terminal of the first contact of the third relay 126 and the first terminal of the fifth pushbutton 124. With electric power at node A, then the first plurality of lights 40 may be switched on. The third relay 126 may include a second contact which couples the first electric power source 50 to the HVAC system 140 controller, such that when the third relay 126 energizes, a signal is sent to the HVAC system 140 to initiate normal operation.

A path may also be created from node A through the second pushbutton 22 and the fourth relay 128 to circuit ground 64, as well as from node A through the second pushbutton 22 and the fifth relay 130 to circuit ground 64. Thus, pressing the second pushbutton 22 energizes the fourth relay 128 and the fifth relay 130, as long as the third relay 126 is energized. Energizing the fourth relay 128 closes the first contacts of the fourth relay 128 and creates a path from node A through the third pushbutton 120 and the fourth pushbutton 122 to maintain energizing of the fourth relay 128. Likewise, energizing the fifth relay 130 closes the first contacts of the fifth relay 130 and creates a path from node A through the fourth pushbutton 122 to maintain energizing of the fifth relay 130.

Energizing the fourth relay 128 may also close a second set of contacts of the fourth relay 128 to send a signal to a second HVAC system 141 controller that monitors the dining room area. The fourth relay 128 may be deenergized, and thus the second HVAC system 141 returns to an inactive mode, by pressing either the third pushbutton 120 or the fourth pushbutton 122. Energizing the fifth relay 130 may switch on the fourth plurality of lights 46, which may include the dining room lights, that is connected to node A through a second set of contacts of the fifth relay 130. The fifth relay 130 may be deenergized, and thus the fourth plurality of lights 46 may be switched off, by pressing the fourth pushbutton 122.

The first photodetector 36 may be connected to the coil of the first relay 32 and energize the first relay 32 as described above. The second photodetector 38 may be connected to the coil of the second relay 34 and energize the second relay 34 as described above.

The first timer circuit 24 and the second timer circuit 26 may be connected and operate substantially similar as described above. Thus, the second plurality of lights 42 may come on when the third relay 126 is energized, which turns on the first timer circuit 24, and the first contacts of the first relay 32 are closed, indicating that it is dark outside the business establishment. The second plurality of lights 42 may stay on for the first period of time (approximately 17 minutes) once the third relay 126 is deenergized and the timer function of the first timer circuit 24 is activated. The second plurality of lights 42 may also be switched on when the third toggle switch 16 is rotated to the On position, thus activating the timer function of the second timer circuit 26. The second plurality of lights 42 may be switched off, assuming that the first contacts of the first relay 32 are open, by rotating the third toggle switch 16 to the Auto position, thereby deactivating the timer function of the second timer circuit 26.

The third timer circuit 28 may be connected and operate substantially similar as described above. However, the fifth terminal of the third timer circuit 28 may be connected to the third plurality of lights 44 and the second terminal of the third contact of the fifth relay 130. Thus, the third plurality of lights 44 may be switched on when the third relay 126, the second relay 34, and the fifth relay 130 are all energized, indicating that the first pushbutton 20 and the second pushbutton 22 have been pressed as well as the exterior ambient light is below a predetermined level. Or, the third plurality of lights 44 may be switched on for the second period of time (approximately three hours) when the fourth toggle switch 18 is rotated to the On position, thus activating the timer function of the third timer circuit 28. The third plurality of lights 44 may be switched off, assuming that the first contacts of the second relay 34 are open, by rotating the fourth toggle switch 18 to the Auto position, thereby deactivating the timer function of the third timer circuit 28.

The system 10 may include the enclosure 112 as described above. Mounted to the enclosure 112 may be the first pushbutton 20, the second pushbutton 22, the third pushbutton 120, the fourth pushbutton 122, and the fifth pushbutton 124, as well as the third toggle switch 16 and the fourth toggle switch 18. Mounted within the enclosure 112 may be the first timer circuit 24, the second timer circuit 26, the third timer circuit 28, the first relay 32, the second relay 34, the third relay 126, the fourth relay 128, and the fifth relay 130. Located outside of the enclosure 112 may be the first photodetector 36 and the second photodetector 38.

The lighting control system 10 of the second embodiment may operate as follows. The business establishment may be a restaurant, as described above. Employees enter the building and access the enclosure 112. Someone presses and releases the first pushbutton 20, labeled "Arrive" (see FIG. 4), energizing the third relay 126 and turning on the first plurality of lights 40 (the kitchen lights) and setting the HVAC system 140 in a normal mode. The first timer circuit 24 turns on and if the first photodetector 36 energizes the first relay 32 (indicating darkness outside), then the second plurality of lights 42 (the lights in the parking lot) turns on. The second plurality of lights 42 (the lights in the parking lot) turn off automatically as daylight increases and turn back on automatically as daylight decreases. As business opens, someone presses and releases the second pushbutton 22, labeled "Open". If the first pushbutton 20 has already been pressed, then the fourth relay 128 and the fifth relay 130 energize. The second HVAC system 141 for the dining room area may initiate normal operation. The fourth plurality of lights 46 (the dining room lights) turns on. If the second photodetector 38 energizes the second relay 34 (indicating darkness outside), then the third plurality of lights 44 (building lights and signs) turns on.

When it is time to close, an employee presses and releases the third pushbutton 120, labeled "Dining Room Close". This turns the second HVAC system 141 to an inactive mode. Then the employee presses and releases the fourth pushbutton 122, labeled "Close". The third (building lights and signs) and fourth (dining room lights) plurality of lights turn off. Employees may continue to finish closing the kitchen area. If the employees forget to press the third and fourth pushbuttons 120, 122, then someone can press and release the fifth pushbutton 124 ("Depart") to turn off all the interior lights (the first and fourth plurality of lights 46) and the third plurality of lights 44 (building lights and signs) and set the HVAC system 140 to the inactive mode. Pressing and releasing the fifth pushbutton 124 ("Depart") also activates the timer function of the first timer circuit 24, allowing the second plurality of lights 42 (parking lot lights) to stay on for the first period of time (approximately 17 minutes) before shutting off automatically.

If maintenance is required for either the second (parking lot lights) or third (building lights and signs) plurality of lights, then the third and fourth toggle switches 16, 18 are accessed. Turning the third toggle switch 16 ("Poles") to the On position activates the timer function of the second timer circuit 26 and turns the second plurality of lights 42 (parking lot lights) on for the second period of time (approximately three hours), before automatically shutting the second plurality of lights 42 off. If maintenance is completed before three hours is up, then the second plurality of lights 42 (parking lot lights) can be turned off by turning the third toggle switch 16 ("Poles") to the Auto position, thereby deactivating the timer function of the second timer circuit 26. Turning the fourth toggle switch 18 ("Signs and Building Lights") to the On position activates the timer function of the third timer circuit 28 and turns the third plurality of lights 44 (building lights and signs) on for the second period of time (approximately three hours), before automatically shutting the third plurality of lights 44 off. If maintenance is completed before three hours is up, then the third plurality of lights 44 (building lights and signs) can be turned off by turning the fourth toggle switch 18 ("Signs and Building Lights") to the Auto position, thereby deactivating the timer function of the third timer circuit 28.

Alternatively, the third plurality of lights 44 (building lights and signs) may be turned on at any time increased visibility of the building is desired by turning the fourth toggle switch 18 ("Signs and Building Lights") to the On position.

Figure 6:
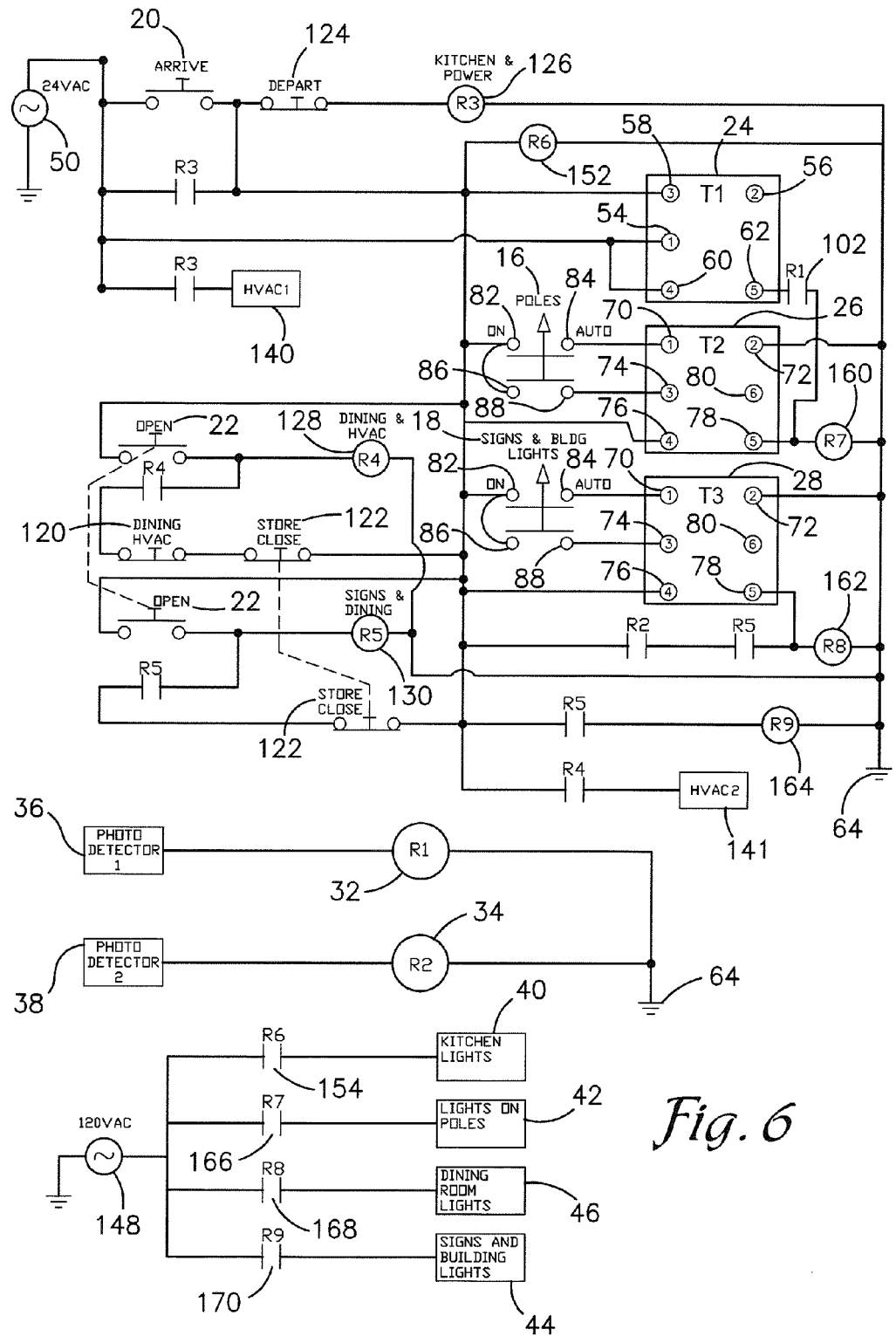
FIG. 6 is a schematic view of the third embodiment of the lighting control system.

A third embodiment of the lighting control system 10 is shown in FIGS. 4 and 6. The third embodiment of the system 10 may be substantially similar in structure and operation to the second embodiment with exceptions as described below.

The system 10 may also include a sixth relay 152, a seventh relay 160, an eighth relay 162, and a ninth relay 164, which may be substantially similar the third, fourth, and fifth relays 126, 128, 130. In the third embodiment, the coils of the sixth, seventh, eighth, and ninth relay 152, 160, 162, 164 may be connected in the system 10 where the first, second, third, and fourth pluralities of lights 40, 42, 44, 46 are connected in the second embodiment. This change in circuit architecture allows the lights to be powered by a second electric power source 148 at a second voltage level.

The coil of the sixth relay 152 may be connected between the node A and circuit ground 64. Thus, the sixth relay 152 may be energized once the third relay 126 is energized, wherein the third relay 126 is energized as discussed above. The contacts 154 of the sixth relay 152 couple the first plurality of lights 40 to the second electric power source 148. The first plurality of lights (kitchen lights) may be turned on when the sixth relay 152 is energized.

The coil of the seventh relay 160 may be connected between the fifth terminal of the second timer circuit 26 and circuit ground 64. The seventh relay 160 may be energized if the first relay 32 is closed (indicating outside darkness) or if the timing function of the second timer circuit 26 is activated during maintenance. The contacts 166 of the seventh relay 160 couple the second plurality of lights 42 to the second electric power source 148. The second plurality of lights (parking lot lights) may be turned on when the seventh relay 160 is energized.

The coil of the eighth relay 162 may be connected between the third contact of the fifth relay 130 and circuit ground 64. The eighth relay 162 may be energized if the second relay 34 and the fifth relay 130 are energized (indicating that business is open and it is dark outside) or if the timing function of the third timer circuit 28 is activated during maintenance. The contacts 168 of the eighth relay 162 couple the third plurality of lights 44 to the second electric power source 148. The third plurality of lights (building lights and signs) may be turned on when the eighth relay 162 is energized.

The coil of the ninth relay 164 may be connected between the second contact of the fifth relay 130 and circuit ground 64. The ninth relay 164 may be energized if the fifth relay 130 is energized (indicating that business is open). The contacts 170 of the ninth relay 164 couple the fourth plurality of lights 46 to the second electric power source 148. The fourth plurality of lights (dining room lights) may be turned on when the ninth relay 164 is energized.

The first relay 32 and the second relay 34 may be energized with a different voltage from the first and second relays 32, 34 described above. The first photodetector 36 and the second photodetector 38 may be coupled to the second electric power source 148. Thus, when the first and second photodetectors 36, 38 turn on, they may energize the first and second relays 32, 34, respectively, with the second voltage level (120 VAC).

The system 10 may include the enclosure 112 as described above. Mounted to the enclosure 112 may be the first pushbutton 20, the second pushbutton 22, the third pushbutton 120, the fourth pushbutton 122, and the fifth pushbutton 124, as well as the third toggle switch 16 and the fourth toggle switch 18. Mounted within the enclosure 112 may be the first timer circuit 24, the second timer circuit 26, the third timer circuit 28, the third relay 126, the fourth relay 128, the fifth relay 130, and the sixth relay 152. Located outside of the enclosure 112 may be the first photodetector 36 and the second photodetector 38. The first relay 32, the second relay 34, the sixth relay 152, the seventh relay 160, the eighth relay 162, and the ninth relay 164 may be mounted within the enclosure 112 or may be mounted in an auxiliary enclosure or a separate wiring facility, perhaps closer to the second electric power source 148.

The lighting control system 10 of the second embodiment may operate as follows. The business establishment may be a restaurant, as described above. Employees enter the building and access the enclosure 112. Someone presses and releases the first pushbutton 20, labeled "Arrive" (see FIG. 4), energizing the third relay 126 and the sixth relay 152 and thereby, turning on the first plurality of lights 40 (the kitchen lights) and setting the HVAC system 140 in a normal mode. The first timer circuit 24 turns on and if the first photodetector 36 energizes the first relay 32 (indicating darkness outside), then the seventh relay 160 energizes and the second plurality of lights 42 (the lights in the parking lot) turns on. The second plurality of lights 42 (the lights in the parking lot) turn off automatically as daylight increases and turn back on automatically as daylight decreases. As business opens, someone presses and releases the second pushbutton 22, labeled "Open". If the first pushbutton 20 has already been pressed, then the fourth relay 128 and the fifth relay 130 energize, thereby energizing the ninth relay 164. The second HVAC system 141 for the dining room area may initiate normal operation. The fourth plurality of lights 46 (the dining room lights) turns on. If the second photodetector 38 energizes the second relay 34 (indicating darkness outside), then the eighth relay 162 energizes and the third plurality of lights 44 (building lights and signs) turns on.

When it is time to close, an employee presses and releases the third pushbutton 120, labeled "Dining Room Close". This turns the second HVAC system 141 to an inactive mode. Then the employee presses and releases the fourth pushbutton 122, labeled "Close". The third (building lights and signs) and fourth (dining room lights) plurality of lights turn off. Employees may continue to finish closing the kitchen area. If the employees forget to press the third and fourth pushbuttons 120, 122, then someone can press and release the fifth pushbutton 124 ("Depart") to turn off all the interior lights (the first 40 and fourth plurality of lights 46) and the third plurality of lights 44 (building lights and signs) and set the HVAC system 140 to the inactive mode. Pressing and releasing the fifth pushbutton 124 ("Depart") also activates the timer function of the first timer circuit 24, allowing the second plurality of lights 42 (parking lot lights) to stay on for the first period of time (approximately 17 minutes) before shutting off automatically.

If maintenance is required for either the second (parking lot lights) or third (building lights and signs) plurality of lights, then the third and fourth toggle switches 16, 18 are accessed.

Turning the third toggle switch 16 ("Poles") to the On position activates the timer function of the second timer circuit 26 and turns the second plurality of lights 42 (parking lot lights) for the second period of time (approximately three hours), before automatically shutting off. If maintenance is completed before three hours is up, then the second plurality of lights 42 (parking lot lights) can be turned off by turning the third toggle switch 16 ("Poles") to the Auto position, thereby deactivating the timer function of the second timer circuit 26. Turning the fourth toggle switch 18 ("Signs and Building Lights") to the On position activates the timer function of the third timer circuit 28 and turns the third plurality of lights 44 (building lights and signs) for the second period of time (approximately three hours), before automatically shutting off. If maintenance is completed before three hours is up, then the third plurality of lights 44 (building lights and signs) can be turned off by turning the fourth toggle switch 18 ("Signs and Building Lights") to the Auto position, thereby deactivating the timer function of the third timer circuit 28.

Alternatively, the third plurality of lights 44 (building lights and signs) may be turned on at any time increased visibility of the building is desired by turning the fourth toggle switch 18 ("Signs and Building Lights") to the On position.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A lighting control system, the system comprising:
   a first toggle switch to switch on and switch off at least a first light;
   a first timer circuit to switch on at least a second light for a first period of time after the first toggle switch is switched off;
   a second timer circuit to switch on at least a third light for a second period of time after a first pushbutton is pressed; and
   a plurality of photodetectors to switch on the second light and the third light while the first toggle switch is switched on and while ambient light is below a minimum level.

2. The system of claim 1, further including a second toggle switch to switch on and switch off at least a fourth light while the first toggle switch is switched on.

3. The system of claim 2, further including a third timer circuit to switch on the second light for the second period of time after a third toggle switch is switched on.

4. The system of claim 3, further including a fourth timer circuit to switch on the third light for the second period of time after a fourth toggle switch is switched on.

5. The system of claim 1, further including a second pushbutton switch that when pressed resets the second timer circuit if the first pushbutton is inadvertently pressed.

6. The system of claim 1, further including a plurality of relays controlled by the plurality of photodetectors to switch on the second light and the third light.

7. A lighting control system, the system comprising:
   a first pushbutton for energizing a first relay to switch on a first light;
   a second pushbutton for deenergizing the first relay to switch off the first light;

a first timer circuit to switch on a second light for a first period of time after the second pushbutton has been pressed; and a plurality of photodetectors to switch on the second light and a third light while the first relay is energized and while ambient light is below a minimum level.

8. The system of claim 7, further including a third pushbutton for energizing a second relay to switch on a heating, ventilation, and air conditioning system and a third relay to switch on a fourth light.

9. The system of claim 8, further including a fourth pushbutton for deenergizing the second relay to switch off the heating, ventilation, and air conditioning system.

10. The system of claim 9, further including a fifth pushbutton for deenergizing the second relay to switch off the heating, ventilation, and air conditioning system and the third relay to switch off the fourth light.

11. The system of claim 8, further including a second timer circuit to switch on the second light for a second period of time after a first toggle switch is switched on.

12. The system of claim 11, further including a third timer circuit to switch on the third light for the second period of time after a second toggle switch is switched on.

13. The system of claim 12, further including a fourth relay and a fifth relay controlled by the plurality of photodetectors to switch on the second light and the third light.

14. A lighting control system, the system comprising:
a first pushbutton for switching on a first light;
a second pushbutton for switching on a second light;
a first photodetector for switching on a third light after the second pushbutton has been pressed and while ambient light is below a minimum level;
a second photodetector for switching on a fourth light after the second pushbutton has been pressed and while ambient light is below a minimum level;
a first relay to couple the first light to a electric power source;
a second relay to couple the second light to the electric power source;
a third relay to couple the third light to the electric power source;
a fourth relay to couple the fourth light to the electric power source; and
a first timer circuit for switching on the second light for a first period of time after a third pushbutton has been pressed.

15. The system of claim 14, further including a second timer circuit for switching on the third light for a second period of time after a first toggle switch is switched on.

16. The system of claim 15, further including a third timer circuit for switching on the fourth light for a second period of time after a second toggle switch is switched on.

* * * * *